US009421887B2

(12) United States Patent
Jung et al.

(10) Patent No.: US 9,421,887 B2
(45) Date of Patent: Aug. 23, 2016

(54) FITTING SYSTEM FOR A VEHICLE SEAT (75) Inventors: Thomas Jung, Aschbach (DE); Dirk Dubois, Hinterweidenthal (DE)

(73) Assignee: KEIPER GmbH & Co. KG, Kaiserslautern (DE)

( * ) Notice: Subject to any disclaimer, the term of this patent is extended or adjusted under 35 U.S.C. 154(b) by 248 days.

(21) Appl. No.: 14/344,084

(22) PCT Filed: Jul. 19, 2012

(86) PCT No.: PCT/EP2012/064182
§ 371 (c)(1),
(2), (4) Date: Mar. 11, 2014

(87) PCT Pub. No.: WO2013/037550
PCT Pub. Date: Mar. 21, 2013

(65) Prior Publication Data
US 2014/0346832 A1    Nov. 27, 2014

(30) Foreign Application Priority Data
Sep. 14, 2011  (DE) .......................... 10 2011 113 747

(51) Int. Cl.
*B60N 2/20*   (2006.01)
*B60N 2/02*   (2006.01)
*B60N 2/225*  (2006.01)
*B60N 2/235*  (2006.01)

(52) U.S. Cl.
CPC .. *B60N 2/20* (2013.01); *B60N 2/02* (2013.01); *B60N 2/206* (2013.01); *B60N 2/225* (2013.01); *B60N 2/2251* (2013.01); *B60N 2/2356* (2013.01); *B60N 2205/50* (2013.01)

(58) Field of Classification Search
CPC .......... B60N 2/20; B60N 2/202; B60N 2/206; B60N 2/225; B60N 2/2251; B60N 2/2356
USPC ......................................................... 297/362
See application file for complete search history.

(56) References Cited

U.S. PATENT DOCUMENTS

| 6,331,034 B1 * | 12/2001 | Specht ................. | B60N 2/0232 297/362 X |
| 6,454,354 B1 | 9/2002 | Vossmann et al. | |
| 6,968,598 B2 * | 11/2005 | Becker .................... | B60N 2/20 297/362 |
| 7,677,665 B2 | 3/2010 | Eppert et al. | |

(Continued)

FOREIGN PATENT DOCUMENTS

| CN | 101 087 706 A | 12/2007 |
| CN | 101 553 380 A | 10/2009 |

(Continued)

*Primary Examiner* — Anthony D Barfield
(74) *Attorney, Agent, or Firm* — McGlew and Tuttle, P.C.

(57) ABSTRACT

A fitting system for a vehicle seat, has at least one fitting (10) which has a first fitting part (11) and a second fitting part (12), which can be interlocked and rotated relative to one another around an axis (A), transmission bar (7), the rotation of which unlocks the fitting (10), and at least one control element (5, 8), the actuation of which effects the rotation of the transmission bar (7). The fitting system includes a gearbox module (70) that is a differential gearbox, arranged concentric to the axis (A), and as a pre-mounted unit. The gearbox module decouples the rotation of the fitting parts (11, 12) and the rotation of the transmission bar (7) from each other. The components, mechanically actuated by manually operated control elements (5, 8), act on the first fitting part (11) or the second fitting part (12) of the at least one fitting (10).

19 Claims, 6 Drawing Sheets

(56) References Cited

U.S. PATENT DOCUMENTS

| | | |
|---|---|---|
| 2010/0139425 A1 | 6/2010 | Schulz et al. |
| 2010/0176640 A1 | 7/2010 | Hayashi et al. |
| 2011/0169313 A1* | 7/2011 | Schulz .............. B60N 2/2257 297/362 |
| 2011/0215626 A1 | 9/2011 | Lehmann |
| 2012/0169105 A1 | 7/2012 | Assmann et al. |

FOREIGN PATENT DOCUMENTS

| | | | |
|---|---|---|---|
| DE | 10 2004 061 960 A1 | 7/2006 | |
| DE | 10 2005 046 807 B3 | 11/2006 | |
| DE | 10 2006 015 560 B3 | 8/2007 | |
| DE | 10 2006 041 917 B3 | 1/2008 | |
| DE | 10 2006 015 558 B3 | 2/2008 | |
| DE | 10 2005 052 201 B4 | 10/2009 | |
| DE | 10 2008 026 176 A1 | 12/2009 | |
| DE | 20 2009 016 989 U1 | 4/2010 | |
| DE | 20 2010 015 171 U1 | 2/2011 | |
| DE | 10 2009 056 396 A1 | 7/2011 | |
| JP | 2009-532144 A | 9/2009 | |
| JP | EP 2735472 A1 * | 5/2014 | ........... B60N 2/2251 |
| KR | 2001-0042253 A | 5/2001 | |
| WO | 2008/052761 A1 | 5/2008 | |

* cited by examiner

FITTING SYSTEM FOR A VEHICLE SEAT

CROSS REFERENCE TO RELATED APPLICATIONS

This application is a United States National Phase Application of International Application PCT/EP2012/064182 filed Jul. 19, 2012 and claims the benefit of priority under 35 U.S.C. §119 of DE 10 2011 113 747.9 filed Sep. 14, 2011, the entire contents of which are incorporated herein by reference.

FIELD OF THE INVENTION

The invention relates to a fitting system for a vehicle seat, in particular a motor vehicle seat, with at least one fitting which comprises a first fitting part and a second fitting part which are able to be interlocked and rotated relative to one another about an axis and with a transmission bar that rotates for unlocking the fitting as well as at least one operating element that effects the rotation of the transmission bar.

BACKGROUND OF THE INVENTION

A fitting system of this type is disclosed in DE 20 2010 015 171 U1. The actuation of the first operating element effects a rotation of the transmission bar which in turn unlocks the two fittings. By means of said fitting system, a backrest of a vehicle seat is pivoted relative to the seat part thereof, in order to adjust a different inclination. If it is additionally necessary to transfer said backrest into a position of non-use, depending on the assignment of the second operating element to the fitting parts relative to the initial position of the transmission bar, the problem occurs that one of the operating elements is inadvertently actuated by the pivoting movement.

SUMMARY OF THE INVENTION

The object of the invention is to improve a fitting system of the type mentioned in the introduction.

According to the invention, a fitting system is provided for a vehicle seat, in particular a motor vehicle seat. The fitting system comprises at least one fitting which comprises a first fitting part and a second fitting part which are able to be interlocked and rotated relative to one another about an axis. A transmission bar is provided, the rotation of which unlocks the fitting. At least one operating element is provided. The actuation of the operating element effects the rotation of the transmission bar. A gear module is configured as a differential gear and is arranged concentrically to the axis and which is configured as a pre-mounted sub-assembly which decouples the rotation of the fitting parts and the rotation of the transmission bar from one another. The components thereof mechanically activated by the manually actuated operating element act on the first fitting part or the second fitting part of the at least one fitting.

The gear module according to the invention decouples the rotation of the fitting parts, which are preferably connected to a backrest and a seat part of the vehicle seat, from the rotation of the transmission bar for unlocking the fitting. Thus, the locked state of the fitting may be maintained even when the operating element and the transmission bar adopt initial positions which are assigned differently to the fitting parts in spatial terms. This is advantageous, in particular, in fitting systems with a plurality of operating elements which could affect the locked state due to the rotation of the fitting parts or when using fittings with a plurality of unlocking options, for example for adjusting the inclination and for free pivoting.

For the decoupling function, the gear module preferably has two planetary gear systems which are geometrically the same and which are coupled together kinematically by means of a common planet carrier. Accordingly, two ring gears, two sun wheels and a plurality of planet gears are preferably provided. The ring gears and sun wheels are operatively connected to the four different components of the fitting system, i.e. the two fitting parts, the transmission bar and the operating element. Each angular difference between the ring gears leads to the unlocking and/or locking of the fitting whilst a common movement of both ring gears has no effect on the angular difference between the sun wheels and thus on the locked state of the fitting, but maintains said locked state.

A combination of two planetary gear systems which are geometrically the same is, for example, disclosed in DE 10 2009 056 396 A1. Such planetary gear systems, however, are an integral component of a drive system and mounted in the housing of the drive system. The drive system is controlled electromechanically by means of an electric motor, a drive disk driven by the motor and a control disk coupled for entrainment with the drive disk. The control disk acts on one of the ring gears. Additional manual emergency actuation is possible.

The gear module according to the invention, however, is a component i.e. a pre-mounted sub-assembly made up of different cooperating components which preferably is intrinsically closed, i.e. in particular has a separate protective housing, and which may be combined in a modular manner with the other components of the fitting system, in particular may also be mounted retrospectively. Preferably, the housing is formed by means of two ring gears which are able to be rotated relative to one another and which are configured to be half-closed and face one another with the open sides, whereby the housing is provided with a slot.

For holding the gear module together axially, i.e. in particular its components, preferably a clip connection which is able to be closed easily is provided. It is particularly preferred that said clip connection at the same time axially secures the gear module to the fitting. Apart from the pre-positioning during mounting, therefore, rotations concentric to the fitting may also be permitted. Preferably, radially protruding arms are provided for the connection to the fitting parts which is fixed in terms of rotation and the operative connection to the operating element, so that the axial constructional space is kept small.

The fitting system according to the invention is preferably used in vehicle seats for adjusting the inclination of the backrest but may also be used at different locations. The design of the fitting as a disk-shaped unit permits any angular alterations between the fitting parts by the relative rotation about the axis. The axial retention of the fitting parts is produced by a clip ring.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figures 10, 11:
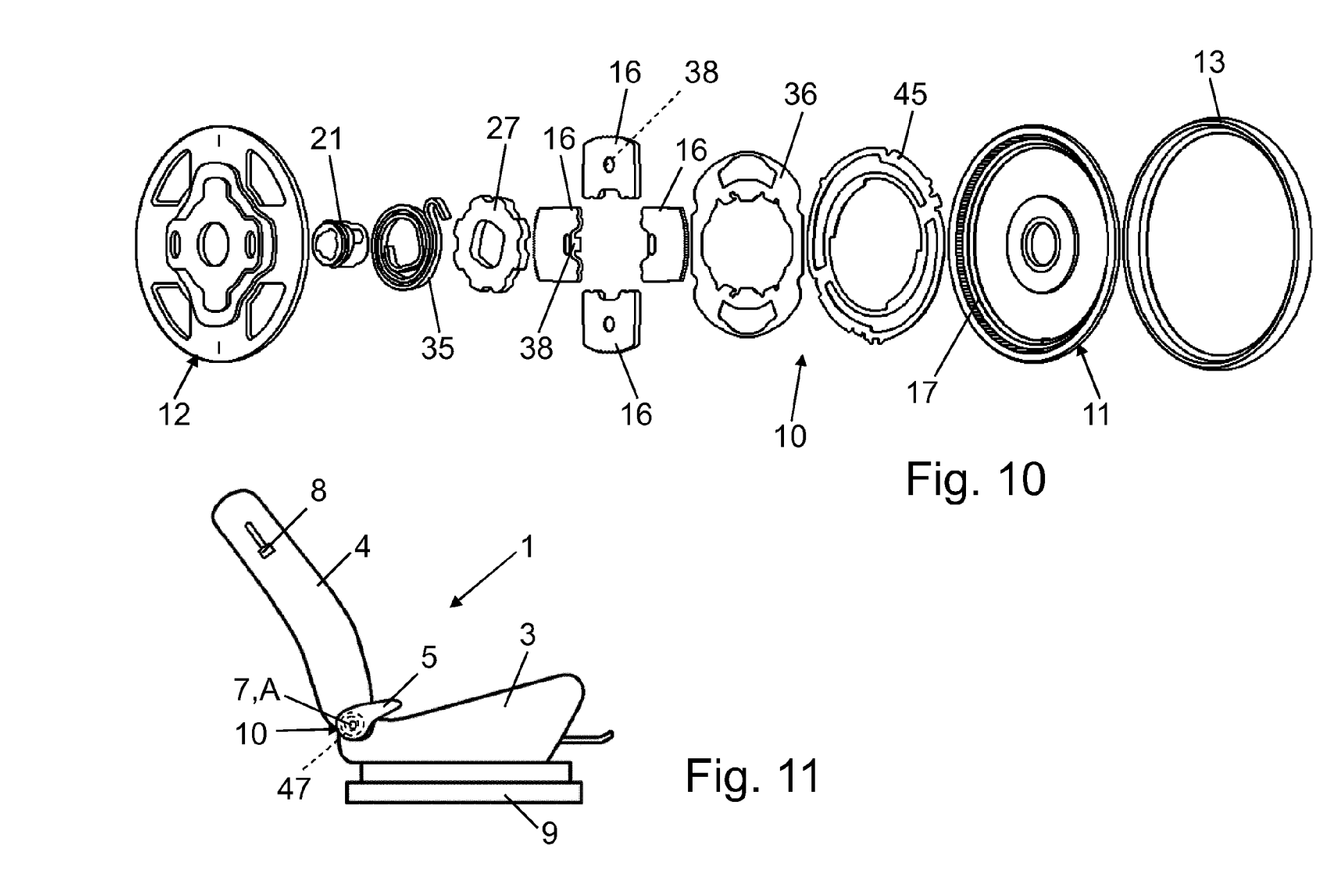
FIG. 10 is an exploded view of the fitting.
FIG. 11 is a schematic view of a vehicle seat.

Referring to the drawings in particular, a vehicle seat 1 for a motor vehicle has a seat part 3 and a backrest 4 which is pivotable relative to the seat part 3 and is able to be locked thereto. The backrest 4 is able to be adjusted in inclination, i.e. it may be adjusted between different positions of use. Moreover, the backrest 4 is able to be pivoted forward from a position of use into a position of non-use, for example a freely-pivoted position (entry position) for facilitating entry to the rear seat row or a table position for increasing the loading space. The inclination adjustment of the backrest 4 and the (central) free pivoting take place about a common axis A, which defines a cylinder coordinate system used hereinafter.

The inclination adjustment of the backrest 4 takes place by manual actuation of a first operating element 5, for example a hand lever. Aligned with the axis A and rotatable about said axis, a (rigid, preferably hollow or optionally solid) transmission bar 7 is provided, said transmission bar being arranged horizontally in the transition region between the seat part 3 and the backrest 4. The first operating element 5 is preferably located fixedly in terms of rotation on the profiled transmission bar 7 in order to rotate said transmission bar. A rotation of the transmission bar 7 by a specific angle, for example up to 30°, unlocks the backrest 4.

The transition into the position of non-use of the backrest 4 takes place by manual actuation of a second operating element 8, for example a further lever on the side of the backrest 4 which also unlocks the backrest 4. Preferably, the vehicle seat 1 has one respective pair of seat rails 9 on both sides of the seat part 3 by means of which it is able to be longitudinally adjusted as a whole (i.e. is able to be adjusted in its longitudinal seating position). Provided the position of non-use is a freely-pivoted position, during the transition into said freely-pivoted position the seat rails 9 are also unlocked and the vehicle seat 1 as a whole is pushed forward, so that in the freely-pivoted position the vehicle seat 1 adopts a front longitudinal seat position which additionally facilitates entry to the rear seat row. The backrest 4 is optionally able to be locked in said freely-pivoted position so that it does not pivot back prematurely by compression of the cushions or when pushing back the vehicle seat 1. The same applies to a table position.

Alternatively or additionally to the manual actuation, the second operating element 8 may be configured as a mechanically, electrically, pneumatically and/or hydraulically operated remote unlocking system which is able to be actuated, for example, from a luggage compartment of the vehicle.

On both sides of the vehicle seat 1, the transmission bar 7 engages in a fitting 10 with a connection which is fixed in terms of rotation (or coupled in entrainment with defined free travel).

Figure 8:
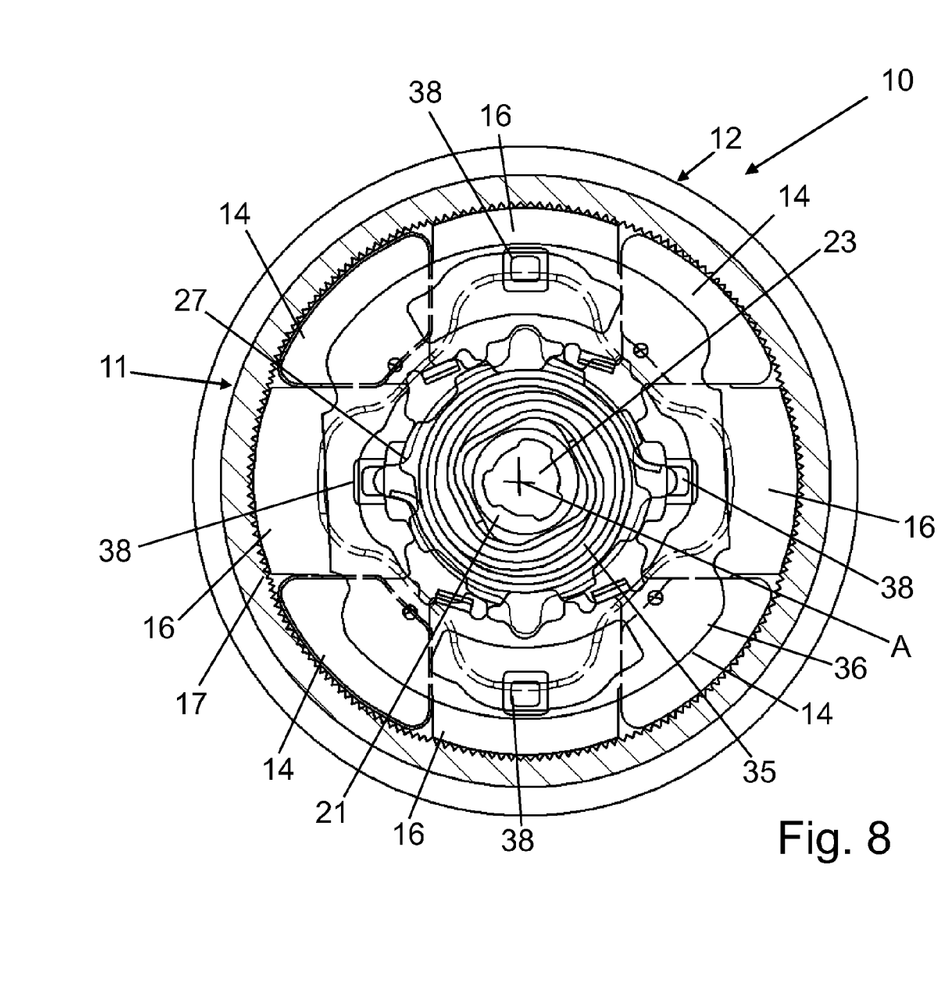
FIG. 8 is a radial sectional view through the fitting along the line VIII-VIII in FIG. 9.
Figure 9:
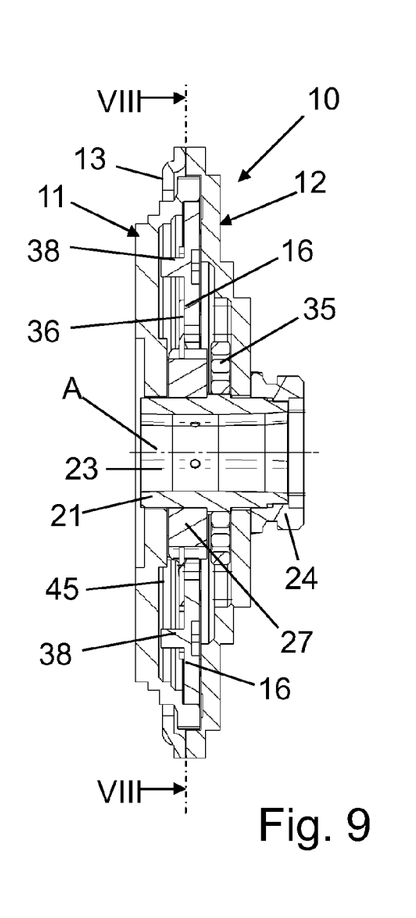
FIG. 9 is an axial sectional view through the fitting.

Each fitting 10 has a first fitting part 11 and a second fitting part 12 which are rotatable relative to one another about the axis A. The two fitting parts 11 and 12 may in each case approximately describe a circular disk shape. Both fitting parts 11 and 12 preferably consist of metal, in particular steel, which is able to be at least partially hardened. A clip ring 13 is provided for receiving the axially acting forces, i.e. for axially holding the fitting parts 11 and 12 together. The clip ring 13 preferably consists of metal, in particular steel, which is preferably unhardened. The clip ring 13 preferably has a substantially flat annular shape but may in an alternative embodiment be profiled in an L-shape with a cylinder portion and on the front face a flat annular portion.

The clip ring 13 is fixedly connected to one of the two fitting parts 11 and 12, in the present case in an outer annular portion to the second fitting part 12, for example, by means of laser welding or by means of a further fastening technique known per se. By means of an inner annular portion, which is arranged in a plane perpendicular to the axial direction, the clip ring 13, optionally by the interposition of a sliding ring, encompasses the first fitting part 11 in the radial outer edge region thereof without hindering the relative movement of the two fitting parts 11 and 12. Additionally, the inner surfaces of the two fitting parts 11 and 12 facing one another are protected from the penetration of foreign bodies and soiling and damage.

The clip ring 13 and the fitting part 11 or 12 fixedly connected thereto thus clamp the other of the two fitting parts 11 and 12 movable relative thereto. In terms of design, the two fitting parts 11 and 12 form a disk-shaped unit together (with the clip ring 13).

When mounting the fitting 10 the first fitting part 11 is, for example, fixedly connected to the structure of the backrest 4, i.e. fixed to the backrest. The second fitting part 12 is then fixedly connected to the structure of the seat part 3, i.e. fixed to the seat part. The assignment of the fitting parts 11 and 12, however, may also be reversed, i.e. the first fitting part 11 would then be fixed to the seat part and the second fitting part 12 would be fixed to the backrest. The fitting 10 is located in the flux of force between the backrest 4 and the seat part 3.

The fitting 10 is configured as a latching fitting in which the first fitting part 11 and the second fitting part 12 are able to be interlocked as is described, for example, in DE 20 2009 016 989 U1, the relevant disclosure thereof being expressly incorporated in the invention.

The second fitting part 12 has—in the present case four—guide segments 14 which in pairs guide one respective locking bar 16 laterally in the radial direction by means of straight guide surfaces. The locking bars 16—in the present case a total of four—are arranged offset to one another—in the present case in each case by 90°—in a constructional space defined between the two fitting parts 11 and 12. The locking bars 16 are provided at their radial outer end with a toothing which is able to be brought into (come into) engagement with a toothed wheel 17 of the first fitting part 11 which is configured as a ring gear. If the toothed wheel 17 and the locking bars 16 cooperate, the fitting 10 is locked.

The first fitting part 11 is arranged in a recess of the second fitting part 12 and is radially externally encompassed thereby, whereby the two fitting parts 11 and 12 support one another. In this case, the radial outer edge region of the first fitting part 11 is arranged with the toothed wheel 17 in the radial direction between the guide segments 14 and the radial outer edge region of the second fitting part 12 (serving for bearing the first fitting part 11). In the case of high loads, for example in the event of a crash, the first fitting part 11—after a deformation—may come to bear with its toothed wheel 17 against the guide segments 14 located closer in the loading direction, which have correspondingly (concentrically) curved surfaces in the direction of the toothed wheel 17. This increases the strength of the fitting 10.

The first fitting part 11 is able to be mounted in the second fitting part 12. However, the circumstances could be exactly reversed, i.e. the second fitting part 12 may be mounted on the first fitting part 11. In principle, however, both arrangements are equivalent.

A drive element 21 is arranged in the center of the fitting 10, said drive element being made of plastics material, for example, and being rotatably mounted on at least one of the two fitting parts 11 and 12, in the present case the first fitting part 11, more specifically in a central opening thereof. On both vehicle seat sides, the drive element 21 is connected fixedly in terms of rotation or at least coupled for entrainment to the transmission bar 7 which is inserted into a bore 23 of the hollow drive element 21. A fastening ring 24 is provided on at least one end of the drive element 21, said fastening ring in the present case consisting of plastics material and preferably being fastened to the drive element 21 by means of ultrasonic welding. The first operating element 5 may be clipped securely and fixedly in terms of rotation to the fastening ring 24.

An eccentric 27 is located fixedly in terms of rotation or at least coupled for entrainment on the drive element 21, said eccentric being arranged in the constructional space defined between the fitting parts 11 and 12. A spring arrangement 35, for example one or two spiral springs nested in one another, is arranged in a central receiver of one of the two fitting parts 11 and 12, in the present case of the second fitting part 12, and in this case supported externally. The spring arrangement 35 acts on the eccentric 27, in the present case by being located fixedly in terms of rotation internally on the drive element 21. Such a spring arrangement 35 is described, for example, in DE 20 2009 016 989 U1, already cited above, or in DE 10 2005 046 807 B3, the relevant disclosure thereof being expressly incorporated in the invention. The eccentric 27, acted upon by the spring arrangement 35, acts on the radially movable locking bars 16 and impinges on said locking bars so that they are forced radially outward in order to come into engagement in the toothed wheel 17, whereby the fitting 10 is locked.

A control disk 36 is axially arranged in the constructional space between the locking bars 16 and the first fitting part 11 and in the present case is located fixedly in terms of rotation on the eccentric 27. The control disk 36 has—in the present case four—control tracks which in each case cooperate with a projection 38 of each locking bar 16. The projections 38 in this case protrude in the axial direction from the locking bars 16 assigned thereto. With a rotation (by a few degrees) of the drive element 21—and the eccentric 27 driven thereby and the control disk 36—counter to the force of the spring arrangement 35, the control disk 36 pulls the locking bars 16 radially inward, i.e. out of the toothed wheel 17, whereby the fitting 10 is unlocked and the two fitting parts 11 and 12 are able to be rotated relative to one another about the axis A. The backrest 4 is now able to be pivoted about the axis A in order to adjust the inclination thereof, i.e. in order to adopt a different position of use.

In two-door motor vehicles, the access to a rear seat row is intended to be facilitated by freely pivoting the backrest 4, for which the unlocked backrest 4 is pivoted forward from one of the positions of use into a freely-pivoted position not suitable for seat use. It increases the operating comfort if the first operating element 5—or the second operating element 8—do not have to be retained during the entire freely-pivoting movement and only lock the fittings in the freely-pivoted position. To this end, optionally an annular freely pivoting control element 45 is provided in the fitting 10, between the control disk 36 and the first fitting part 11, about the axis A as described, for example, in DE 10 2006 015 560 B3, the relevant disclosure thereof being expressly incorporated in the invention.

The two fittings 10, the transmission bar 7 and the two operating elements 5 and 8 are parts of a fitting system, generally also including at least one backrest compensation spring 47, preferably two backrest compensation springs 47. The backrest compensation springs 47 provided are supported, on the one hand, on the seat part 3 and, on the other hand, on the backrest 4 and preferably configured as spiral springs—encompassing the axis A. An arrangement on respectively one of the two fittings 10 is preferred, wherein one of the two supports may be provided on a support bushing (which is preferably welded on) on the assigned fitting 10. If, proceeding from a position of use, the fittings 10 are unlocked, the backrest compensation spring 47 at least partially compensates for the weight of the backrest 4 which is slightly inclined to the rear, i.e. it assists the pivoting movement of the backrest 4 to the front which improves the operating comfort.

A gear module 70 also forms part of the fitting system according to the invention which, on the one hand, decouples (compensates for) the pivoting movement of the backrest 4 relative to the seat part 3—i.e. the rotation of the fitting parts 11 and 12—and the rotation of the transmission bar 7 from one another and, on the other hand, is activated by the operating elements 5 and 8 in order to act on the fittings 10. The gear module 70 is configured as a sub-assembly which is pre-mounted and is also able to be added retrospectively to the fitting system which is present. The gear module 70 is intrinsically closed, i.e. it has a housing which protects the components located on the inside. The gear module 70 is in the present case arranged adjacent to (i.e. in the immediate spatial vicinity of) one of the two fittings 10 and axially offset to said fitting 10, for example on the vehicle seat side opposing the first operating element 5, or on the side of the fitting 10 remote from the first operating element 5. The gear module 70 is specifically designed for backrests 4 having positions of non-use, in particular entry positions or table positions, in particular when to this end the backrest 4 pivots via an angular range which is greater than the angle of rotation of the transmission bar 7. The gear module 70, however, may also be used for other backrests 4.

Figure 1:
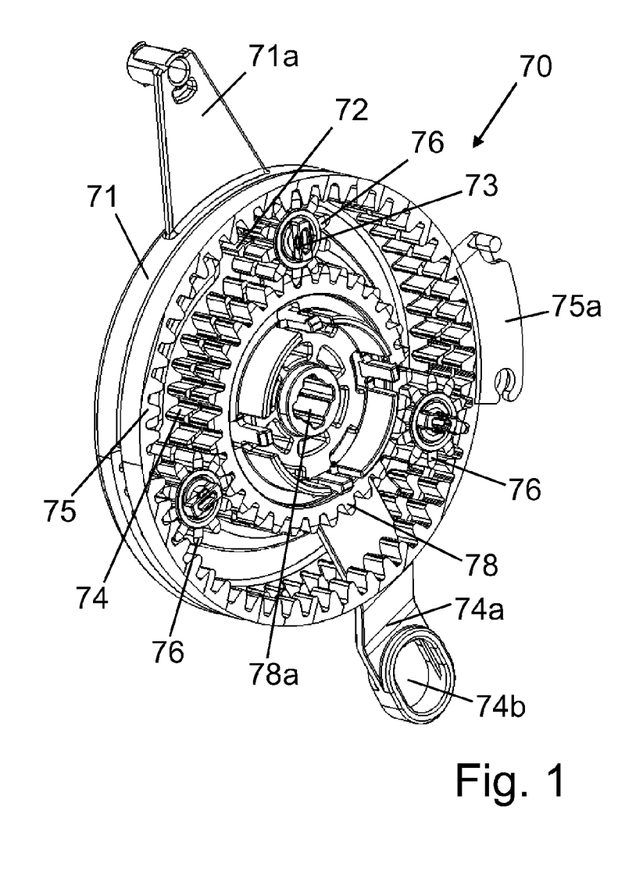
FIG. 1 is a partially sectional perspective view of the gear module.
Figure 2:
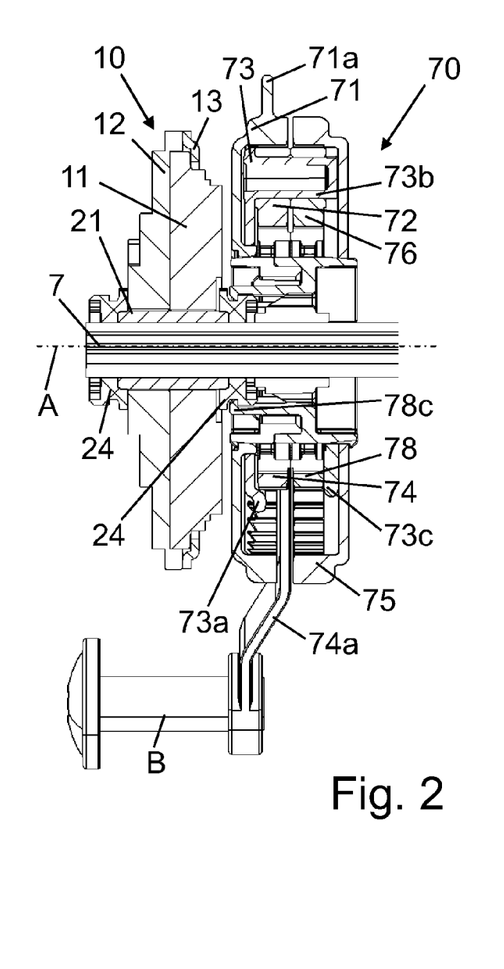
FIG. 2 is an axial sectional view through the gear module with the fitting shown schematically.
Figure 3:
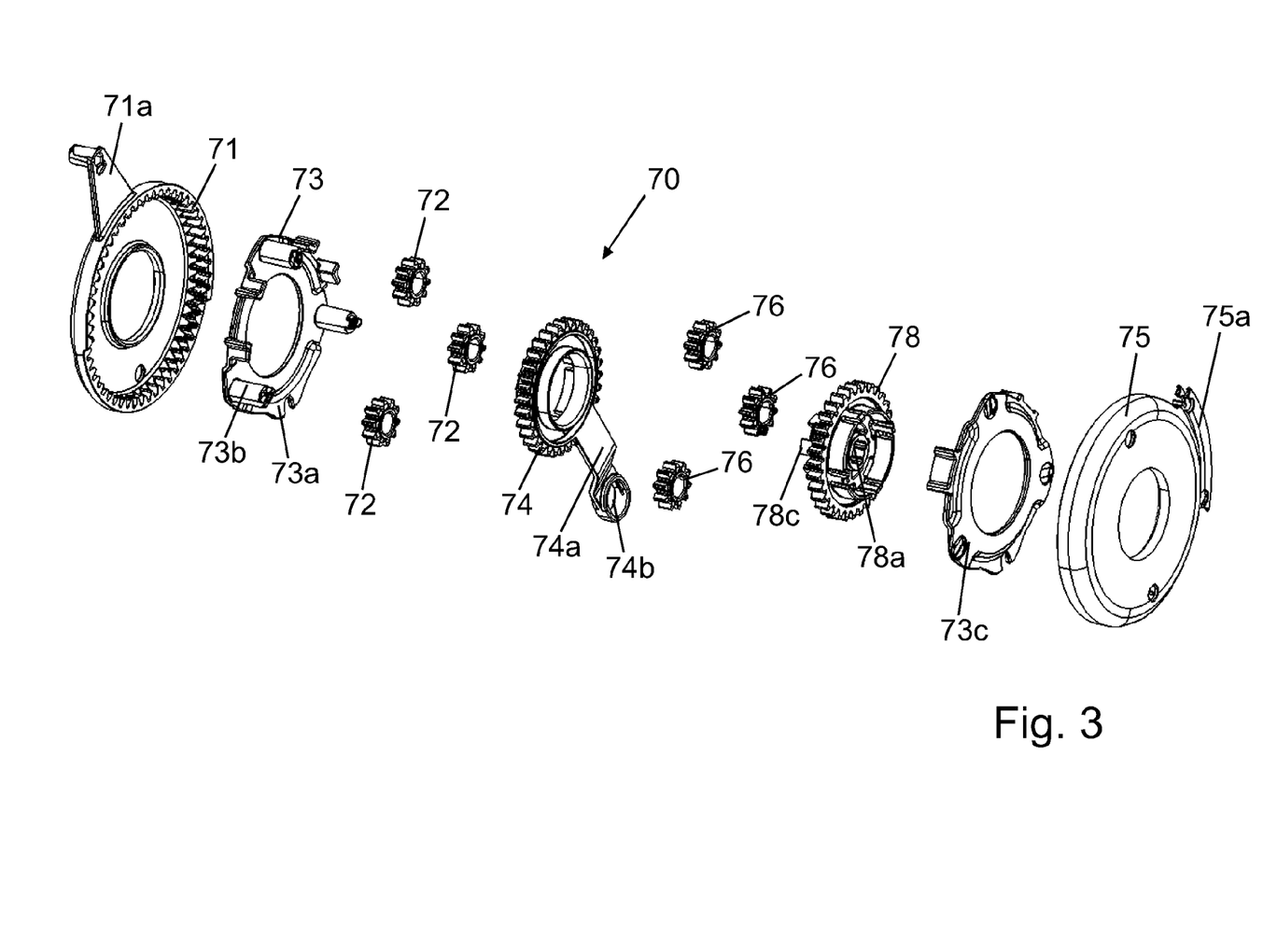
FIG. 3 is an exploded view of the gear module.

The design of the gear module 70 is shown in more detail in FIGS. 1 to 3. The gear module 70 serves as a differential gear and is arranged concentrically to the axis A. The gear module 70 consists of two planetary gear systems which are geometrically the same (i.e. the same, in particular relative to the diameter and the number of teeth) and which are arranged in axially adjacent planes. The gear module 70 has a first ring gear 71 curved about the axis A, which is preferably connected fixedly in terms of rotation to the backrest 4 (i.e. in the present case to the first fitting part 11), at least one (preferably three) first planet gear(s) 72 meshing with the inner toothing of the first ring gear 71 and rotatably mounted on a planet carrier 73, and a first sun wheel 74 which is curved about the axis A and preferably connected fixedly in terms of rotation to the seat part 3 (i.e. in the present case to the second fitting part 12), more specifically to a lower part of the fitting 10 fixed to the seat part. The gear module 70 also comprises a second ring gear 75 which is operatively connected to the second operating element 8, at least one (preferably three) second planet gear(s) 76 meshing with the inner toothing of the second ring gear 75 and rotatably mounted on the aforementioned planet carrier 73 (and rotatable independently of the adjacent first planet gear 72) and a second sun wheel 78 which is curved about the axis A and—in at least one rotational direction—is connected fixedly in terms of rotation (or coupled for entrainment) to the transmission bar 7. The planet carrier 73 couples the two planetary gear systems kinematically. The ring gears 71 and 75 and the sun wheels 74 and 78 may be configured as toothed wheel segments, provided the full circumference is not required for the use of the gear module 70.

The planet carrier 73 is preferably of multi-part configuration and in the exemplary embodiment consists of an annular axle carrier 73a, axially protruding planet gear axles 73b on the axle carrier 73a, which in each case mount one of the first planet gears 72 and one of the second planet gears 76, and an annular axle support 73c offset parallel to the axle carrier 73a.

The first ring gear 71 is preferably configured to be half-closed so that it is able to form a component of the housing of the gear module 70. For a connection which is fixed in terms of rotation to the backrest 4, preferably a first arm 71a protrudes radially outward from the first ring gear 71. The first arm 71a has at its free end a pin which engages in an opening of the structure of the backrest 4 or alternatively has an opening which is pushed onto a bolt fixed to the backrest. Alternatively, a further type of fastening is provided, for example welding, riveting, screwing or adhesive bonding.

For the connection which is fixed in terms of rotation to the seat part 3, preferably a second arm 74a protrudes from the first sun wheel 74, which—by means of a bent portion—axially protrudes radially outward between the two ring gears 71 and 75. The second arm 74a has at its free end an opening 74b which is penetrated by a fastening means B fixed to the seat part, preferably a screw. The opening 74b is preferably configured as a slot in order to be able to compensate for tolerances. As an alternative to the opening 74b, a pin is provided at the free end of the second arm 74a, said pin engaging in an opening of the structure of the seat part 3. As another alternative, a further type of fastening is provided, for example welding, riveting, screwing or adhesive bonding.

For a connection which is fixed in terms of rotation to the transmission bar 7, the second sun wheel 78 has a suitably profiled bar receiver 78a. For axially securing the gear module 70 to the fitting 10 arranged in the immediate vicinity, the second sun wheel 78 cooperates with one of the two fastening rings 24 present on the drive element 21. To this end, the sun wheel 78 preferably has clip hooks 78c which engage behind the fastening ring 24, providing a clip connection. The clip connection also ensures the axial retention of the components of the gear module 70.

A shift cable 81, preferably a Bowden cable, is provided for the operative connection to the second operating element 8, the sheath of said Bowden cable being supported on a bracket 84 of the backrest 4. The bracket 84 may be supported, fastened or integrally formed directly on the backrest 4 or on the first arm 71a or on the first ring gear 71. For suspending the shift cable 81 on the gear module 70, the second ring gear 75 has a shift arm 75a, for example a radially protruding cam with a receiver for a nipple of the shift cable 81. The shift cable 81 may also be connected in a different manner to the second ring gear 75 and/or the shift arm 75a. Also, the second ring gear 75 is preferably configured to be half-closed, so that it is able to form together with the first ring gear 71 the (slotted) housing of the gear module 70. A bar which is coupled with free travel (for example a slot) to the shift arm 75a may also be used as an alternative to the shift cable 81.

The mode of operation of the gear module 70 is shown in more detail in FIGS. 4 to 7, wherein a table position is selected as the position of non-use. In the locked position of use (FIG. 4), all components are in their initial position.

Figure 4:
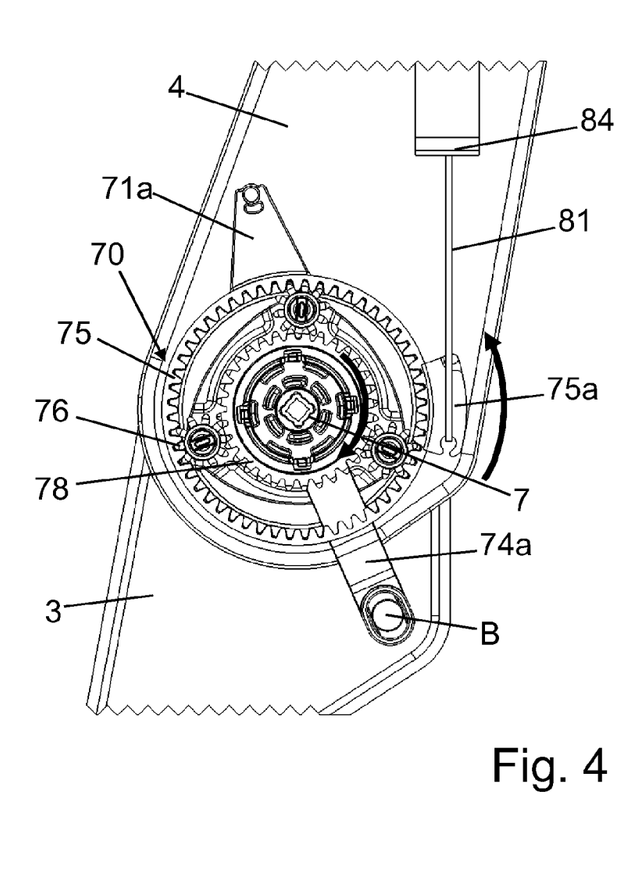
FIG. 4 is a partially sectional side view of the exemplary embodiment in the locked position of use.
Figure 5:
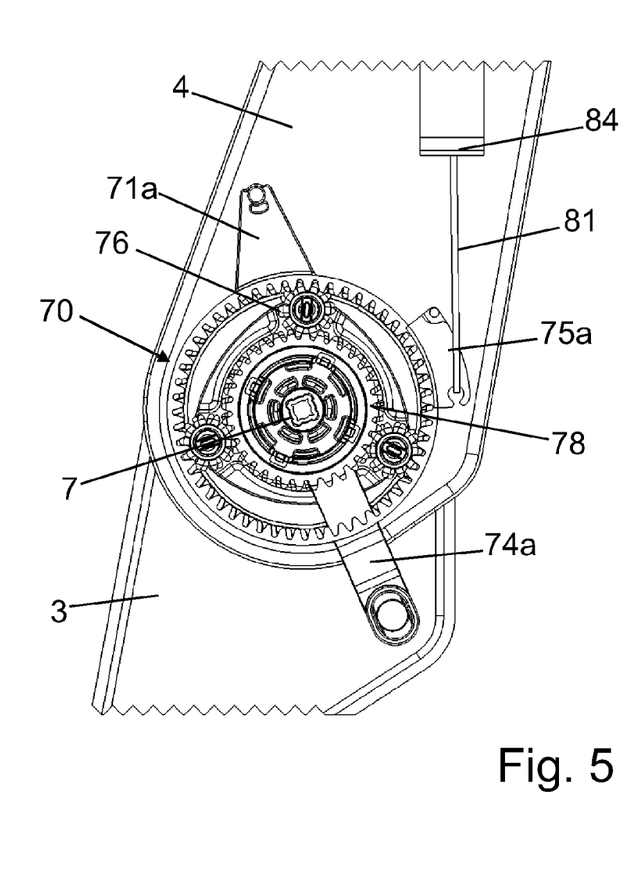
FIG. 5 is a view according to FIG. 4 in the unlocked position of use.

The locked fittings 10 fasten the first ring gear 71, which is fixed to the backrest and connected fixedly in terms of rotation to the first fitting part 11, and the first sun wheel 74, which is fixed to the seat part and connected fixedly in terms of rotation to the second fitting part 12, relative to one another and—due to the mutual engagement of the gears—also the first planet gears 72 and the planet carrier 73. The movement of the components of the gear module 70 may be revealed most clearly by the arms 71a, 74a and 75a and by the space between the holder 84 and the shift arm 75a.

For the transition from the locked position of use (FIG. 4) into the unlocked position of use (FIG. 5) two equivalent options exist. An actuation of the second operating element 8 (transfer into the position of non-use) produces traction on the shift cable 81, which in turn acts on the shift arm 75a and, as a result, rotates the second ring gear 75 about the axis A (in FIG. 4 counterclockwise). As the planet carrier 73 is fixed, the second ring gear 75 drives the second planet gears 76 to rotate in the same direction (but geared up) about the planet gear axles 73b, which in turn drive the second sun wheel 78 to rotate in the opposing direction (but geared down) (in FIG. 4 clockwise). This rotation of the second sun wheel 78 effects a rotation of the transmission bar 7 and as a result an unlocking of the fittings 10, whereby the unlocked position of use is reached.

Alternatively, an actuation of the first operating element 5 (inclination adjustment) also effects a rotation of the transmission bar 7 (clockwise in FIG. 4) and as a result an unlocking of the fittings 10. As the transmission bar 7 at the same time rotates the second sun wheel 78 in the same direction, this leads to a rotation in the opposing direction of the fixed second planet gears 76 and of the second ring gear 75 so that the same image of the unlocked position of use (FIG. 5) results (apart from the slack in the shift cable 81).

For the transition from the unlocked position of use (FIG. 5) to the unlocked position of non-use (FIG. 6) the backrest 4 is pivoted forward relative to the seat part 3. As a result, the first ring gear 71 which is fixed to the backrest and connected fixedly in terms of rotation to the first fitting part 11, rotates relative to the first sun wheel 74 which is fixed to the seat part and connected fixedly in terms of rotation to the second fitting part 12 (in FIG. 5 counterclockwise) about the axis A. As the first sun wheel 74 is fixed, the first ring gear 71 forces the first planet gears 72 to rotate in the same direction (but geared up) about the planet gear axles 73b and the planet carrier 73 to rotate in the same direction (but geared down) about the axis A. The movement of the planet carrier 73 also forces the second planet gears 76 to rotate about the planet gear axles 73b. Provided the second operating element 8 remains actuated, the second ring gear 75 rotates synchronously with the first ring gear 71, so that the second sun wheel 78 (and thus the transmission bar 7) remains unrotated i.e. the fittings 10 remain unlocked.

Figure 6:
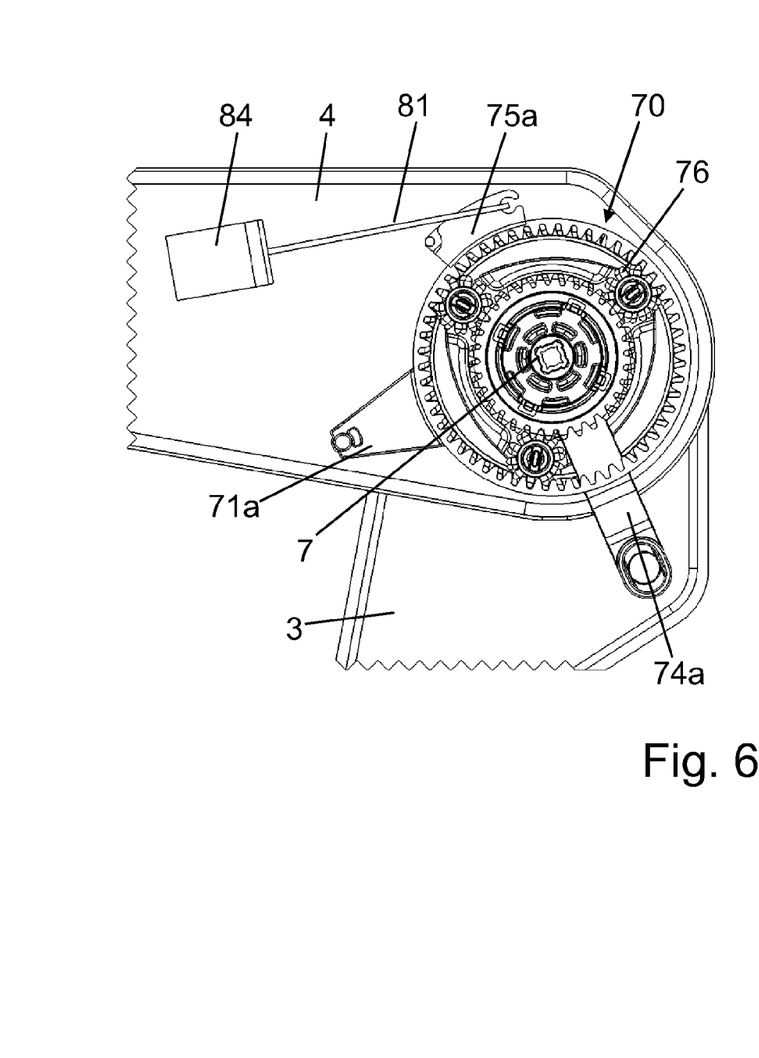
FIG. 6 is a view according to FIG. 4 in the unlocked position of non-use.
Figure 7:
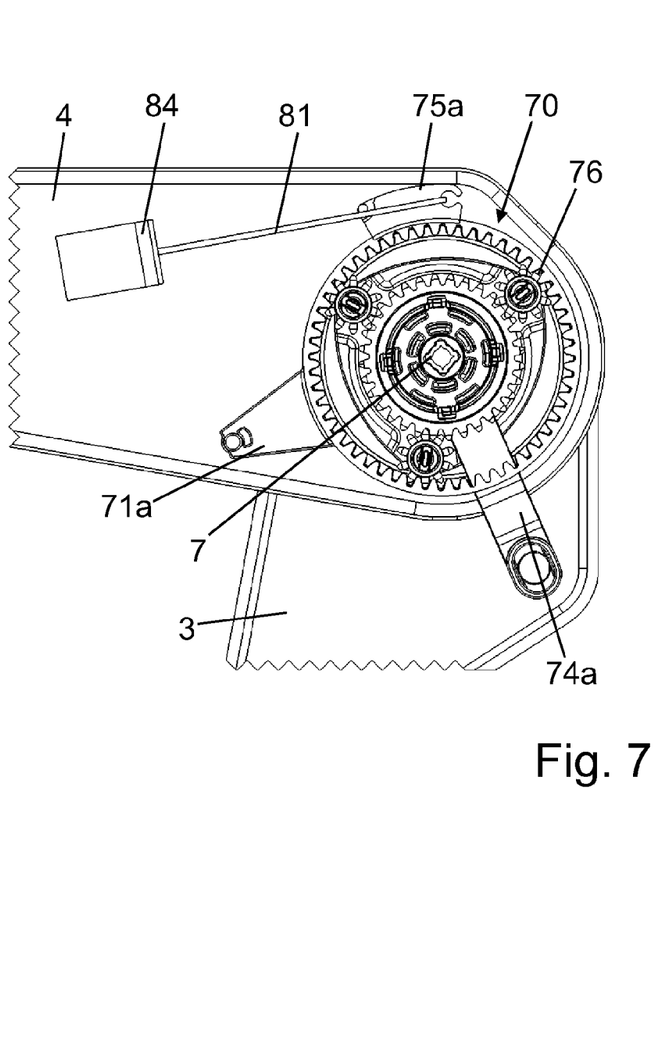
FIG. 7 is a view according to FIG. 4 in the locked position of non-use.

If the second operating element 8 were to be released, a restoring spring, for example the spring arrangement 35 or a compression spring acting between the holder 84 and the shift arm 75a, would lead to a relative rotation (in the opposing direction) of the second ring gear 75 relative to the first ring gear 71, which by means of the second planet gears 76 would then lead to a rotation of the second sun wheel 78 (and the transmission bar 7) into the assigned initial position, i.e. to a locking of the fittings 10. In order to prevent this, the above-mentioned freely-pivoting control element 45 is provided. Said control element is then able to prevent rotations of the transmission bar 7 and the second sun wheel 78 as well as the relative rotation of the second ring gear 75. The same mode of operation results when the first operating element 5 has been actuated, i.e. a transition into a different position of use takes place.

If the unlocked position of non-use (FIG. 6) is reached, the second operating element 8 may be released or the freely-pivoting control element 45 releases the rotation of the transmission bar 7. The fixed backrest 4 secures the first ring gear 71 and thus the first planet gears 72 and the planet carrier 73. As a result, the aforementioned restoring spring ensures a rotation in the opposing direction of the second ring gear 75 and the second sun wheel 78, with the second planet gears 76 rotating about the fixed planet gear axles 73b. The rotation of the second sun wheel 78 back into the initial position leads (by means of the transmission bar 7) to the locking of the fittings 10. Moreover, the shift cable 81 is pulled tightly. Thus the locked position of non-use (FIG. 7) is reached. The return to the original position of use takes place by a further actuation of the second operating element 8, reversed movements of the components of the gear module 70 and the pivoting-back of the backrest 4.

In order to prevent a movement of the first operating element 5 when actuating the second operating element 8, the drive element between the transmission bar 7 and the second sun wheel 78 according to DE 10 2008 026 176 A1 or DE 10 2006 041 917 A1 may be limited to one rotational direction. The relevant disclosure thereof is expressly incorporated in the invention.

In a modified embodiment, one of the operating elements 5 or 8 is dispensed with. The potential usage of the gear module 70 and the mode of operation thereof, however, remain the same. The assignment of the first ring gear 71 and the first sun wheel 74 to the fitting parts 11 and 12 may be reversed.

While specific embodiments of the invention have been shown and described in detail to illustrate the application of the principles of the invention, it will be understood that the invention may be embodied otherwise without departing from such principles.

The invention claimed is:

1. A fitting system for a vehicle seat, the fitting system comprising:
   at least one fitting which comprises a first fitting part and a second fitting part which are able to be interlocked and rotated relative to one another about an axis;
   a transmission bar, the rotation thereof unlocking the fitting;
   at least one operating element, the actuation thereof effecting the rotation of the transmission bar;
   a gear module configured as a differential gear and arranged concentrically to the axis and which is configured as a pre-mounted sub-assembly which decouples the rotation of the fitting parts and the rotation of the transmission bar from one another, the gear module comprising components which are mechanically activated by the manually actuated operating element acting on the first fitting part or the second fitting part of the at least one fitting, the gear module comprising a first half-closed ring gear and a second half-closed ring gear, the first half-closed ring gear comprising a first half-closed ring gear open side and a first half-closed ring gear front face, the second half-closed ring gear comprising a second half-closed ring gear open side and a second half-closed ring gear front face, the first ring gear and the second ring gear facing one another with the first half-closed ring gear open side facing the second half-closed ring gear open side and the first half-closed ring gear and the second half-closed ring gear being assembled at the first half-closed ring gear front face and the second half-closed ring gear front face to form a housing of the gear module.

2. The fitting system as claimed in claim 1, wherein the gear module has two planetary gear systems which are geometrically the same and which are arranged axially adjacent and which are coupled together kinematically by means of a common planet carrier.

3. The fitting system as claimed in claim 1, wherein the the first half-closed ring gear is located opposite the second half-closed ring gear in an axial direction with respect to the axis.

4. The fitting system as claimed in claim 1, wherein the gear module is axially secured on the at least one fitting by means of a clip connection between a fastening ring of the at least one fitting and a sun wheel of the gear module.

5. The fitting system as claimed in claim 1, further comprising clip connection means for axially holding together the components of the gear module, the clip connection means securing the gear module to the fitting.

6. The fitting system as claimed in claim 1, wherein the gear module has radially protruding arms for the fastening and/or for the activation by means of the operating element.

7. A fitting system as claimed in claim 1, wherein the first half-closed ring front face is located opposite the second half-closed ring front face in an axial direction with respect to the axis.

8. A fitting system for a vehicle seat, the fitting system comprising:
   at least one fitting which comprises a first fitting part and a second fitting part which are able to be interlocked and rotated relative to one another about an axis;
   a transmission bar, the rotation thereof unlocking the fitting;
   at least one operating element, the actuation thereof effecting the rotation of the transmission bar;
   a gear module configured as a differential gear and arranged concentrically to the axis and which is configured as a pre-mounted sub-assembly which decouples the rotation of the fitting parts and the rotation of the transmission bar from one another, the gear module comprising components which are mechanically activated by the manually actuated operating element acting on the first fitting part or the second fitting part of the at least one fitting, wherein the gear module comprises
   two planetary gear systems which are geometrically the same and which are arranged axially adjacent and which are coupled together kinematically by means of a common planet carrier
   a first ring gear which is connected fixedly in terms of rotation to the first fitting part,
   at least one first planet gear which meshes with the first ring gear,
   a planet carrier which rotatably mounts the at least one first planet gear,
   a first sun wheel which meshes with the at least one first planet gear and which is connected fixedly in terms of rotation to the second fitting part,
   a second ring gear,
   at least one second planet gear which meshes with the second ring gear and which the planet carrier rotatably mounts, and
   a second sun wheel which meshes with the at least one second planet gear, wherein the operating element cooperates mechanically with the second ring gear and/or the second sun wheel for activating the gear module, and wherein the second sun wheel is connected fixedly in terms of rotation or is coupled for entrainment to the transmission bar in order to act on the at least one fitting.

9. A fitting system for a vehicle seat, the fitting system comprising:
   at least one fitting which comprises a first fitting part and a second fitting part which are able to be interlocked and rotated relative to one another about an axis;
   a transmission bar, the rotation thereof unlocking the fitting;
   at least one operating element, the actuation thereof effecting the rotation of the transmission bar;
   a gear module configured as a differential gear and arranged concentrically to the axis and which is configured as a pre-mounted sub-assembly which decouples the rotation of the fitting parts and the rotation of the transmission bar from one another, the gear module comprising components which are mechanically activated by the manually actuated operating element acting on the first fitting part or the second fitting part of the at least one fitting; and
   a shift cable wherein the operating element cooperates mechanically with the shift cable which is connected to a shift arm component of the gear module provided on a ring gear.

10. A fitting system for a vehicle seat, the fitting system comprising:
    at least one fitting which comprises a first fitting part and a second fitting part which are able to be interlocked and rotated relative to one another about an axis;
    a transmission bar, the rotation thereof unlocking the fitting;
    at least one operating element, the actuation thereof effecting the rotation of the transmission bar; and
    a gear module configured as a differential gear and arranged concentrically to the axis and which is configured as a pre-mounted sub-assembly which decouples the rotation of the fitting parts and the rotation of the transmission bar from one another, the gear module comprising components which are mechanically activated by the manually actuated operating element acting on the first fitting part or the second fitting part of the at least one fitting, wherein
    a toothed wheel is formed on the first fitting part,
    the second fitting part guides radially displaceable locking bars which cooperate with the toothed wheel in order to lock the fitting,
    a spring-loaded eccentric, which is rotatable by means of a drive element, acts upon the locking bars and
    the transmission bar, when rotated, rotates the drive element which as a result rotates the eccentric.

11. A vehicle seat comprising:
    a seat part;
    a backrest which is attached to the seat part; and
    a fitting system, the backrest being pivotable relative the seat part and the backrest being locked thereto by means of a fitting system, the fitting system comprising:
    a fitting which comprises a first fitting part and a second fitting part which are able to be interlocked and rotated relative to one another about an axis;
    a transmission bar, the rotation thereof unlocking the fitting;
    at least one operating element, the actuation thereof effecting the rotation of the transmission bar;
    a gear module configured as a differential gear and arranged concentrically to the axis and which is configured as a pre-mounted sub-assembly which decouples the rotation of the fitting parts and the rotation of the transmission bar from one another, the gear module comprising components which are mechanically activated by the manually actuated operating element acting on the first fitting part or the second fitting part of the at least one fitting, wherein the gear module comprises:
    two planetary gear systems which are geometrically the same and which are arranged axially adjacent and which are coupled together kinematically by means of a common planet carrier
    a first ring gear which is connected fixedly in terms of rotation to the first fitting part;
    at least one first planet gear which meshes with the first ring gear;
    a planet carrier which rotatably mounts the at least one first planet gear;
    a first sun wheel which meshes with the at least one first planet gear and which is connected fixedly in terms of rotation to the second fitting part;
    a second ring gear;
    at least one second planet gear which meshes with the second ring gear and which the planet carrier rotatably mounts; and
    a second sun wheel which meshes with the at least one second planet gear, wherein the operating element cooperates mechanically with the second ring gear and/or the second sun wheel for activating the gear module, and wherein the second sun wheel is connected fixedly in terms of rotation or is coupled for entrainment to the transmission bar in order to act on the at least one fitting.

12. The vehicle seat as claimed in claim 11, further comprising a shift cable wherein the operating element cooperates mechanically with the shift cable which is connected to a shift arm component of the gear module provided on a ring gear.

13. The vehicle seat as claimed in claim 11, wherein the gear module comprises two half-closed ring gears which face one another with their open sides and assembled together form a housing of the gear module.

14. The vehicle seat as claimed in claim 11, wherein the gear module is axially secured on the at least one fitting by means of a clip connection between a fastening ring of the at least one fitting and a sun wheel of the gear module.

15. The vehicle seat as claimed in claim 11, further comprising clip connection means for axially holding together the components of the gear module the clip connection means securing the gear module to the fitting.

16. The vehicle seat as claimed in claim 11, wherein the gear module has radially protruding arms for the fastening and/or for the activation by means of the operating element.

17. The vehicle seat as claimed in claim 11, wherein:
    a toothed wheel is formed on the first fitting part;
    the second fitting part guides radially displaceable locking bars which cooperate with the toothed wheel in order to lock the fitting;
    a spring-loaded eccentric, which is rotatable by means of a drive element, acts upon the locking bars; and
    the transmission bar, when rotated, rotates the drive element which as a result rotates the eccentric.

18. A vehicle seat comprising:

a seat part;

a backrest which is attached to the seat part; and a fitting system, the backrest being pivotable relative the seat part and the backrest being locked thereto by means of a fitting system, the fitting system comprising:

a fitting which comprises a first fitting part and a second fitting part which are able to be interlocked and rotated relative to one another about an axis;

a transmission bar, the rotation thereof unlocking the fitting;

at least one operating element, the actuation thereof effecting the rotation of the transmission bar;

a gear module configured as a differential gear and arranged concentrically to the axis and which is configured as a pre-mounted sub-assembly which decouples the rotation of the fitting parts and the rotation of the transmission bar from one another, the gear module comprising components which are mechanically activated by the manually actuated operating element acting on the first fitting part or the second fitting part of the at least one fitting; and a shift cable, wherein the operating element cooperates mechanically with the shift cable which is connected to a shift arm component of the gear module provided on a ring gear.

19. A vehicle seat comprising:

a seat part;

a backrest which is attached to the seat part; and a fitting system, the backrest being pivotable relative the seat part and the backrest being locked thereto by means of a fitting system, the fitting system comprising:

a fitting which comprises a first fitting part and a second fitting part which are able to be interlocked and rotated relative to one another about an axis;

a transmission bar, the rotation thereof unlocking the fitting;

at least one operating element, the actuation thereof effecting the rotation of the transmission bar; and a gear module configured as a differential gear and arranged concentrically to the axis and which is configured as a pre-mounted sub-assembly which decouples the rotation of the fitting parts and the rotation of the transmission bar from one another, the gear module comprising components which are mechanically activated by the manually actuated operating element acting on the first fitting part or the second fitting part of the at least one fitting, wherein:

a toothed wheel is formed on the first fitting part;

the second fitting part guides radially displaceable locking bars which cooperate with the toothed wheel in order to lock the fitting;

a spring-loaded eccentric, which is rotatable by means of a drive element, acts upon the locking bars; and the transmission bar, when rotated, rotates the drive element which as a result rotates the eccentric.

* * * * *